(12) United States Patent
Farjadrad et al.

(10) Patent No.: US 12,248,413 B1
(45) Date of Patent: *Mar. 11, 2025

(54) UNIVERSAL MEMORY INTERFACE UTILIZING DIE-TO-DIE (D2D) INTERFACES BETWEEN CHIPLETS

(71) Applicant: Eliyan Corporation, Santa Clara, CA (US)

(72) Inventors: Ramin Farjadrad, Los Altos, CA (US); Syrus Ziai, Los Altos, CA (US); Curtis McAllister, Los Altos, CA (US)

(73) Assignee: Eliyan Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,675

(22) Filed: May 1, 2024

Related U.S. Application Data

(60) Provisional application No. 63/543,517, filed on Oct. 11, 2023.

(51) Int. Cl.
*G06F 13/16* (2006.01)

(52) U.S. Cl.
CPC ...... *G06F 13/1668* (2013.01); *G06F 13/1689* (2013.01)

(58) Field of Classification Search
CPC .................. G06F 13/1668; G06F 13/1689
USPC ................ 710/4, 20, 29, 30, 31, 38, 305
See application file for complete search history.

(56) References Cited

U.S. PATENT DOCUMENTS

| | | | |
|---|---|---|---|
| 4,334,305 A | 6/1982 | Girardi | |
| 5,396,581 A | 3/1995 | Mashiko | |
| 5,677,569 A | 10/1997 | Choi | |
| 5,892,287 A | 4/1999 | Hoffman | |
| 5,910,010 A | 6/1999 | Nishizawa | |
| 6,031,729 A | 2/2000 | Berkely | |
| 6,055,235 A | 4/2000 | Blanc | |
| 6,417,737 B1 | 7/2002 | Moloudi | |
| 6,492,727 B2 | 12/2002 | Nishizawa | |
| 6,690,742 B2 | 2/2004 | Chan | |
| 6,721,313 B1 | 4/2004 | Van Duyne | |
| 6,932,618 B1 | 8/2005 | Nelson | |
| 7,027,529 B1 | 4/2006 | Ohishi | |
| 7,248,890 B1 | 7/2007 | Raghavan | |
| 7,269,212 B1 | 9/2007 | Chau | |
| 7,477,615 B2 | 1/2009 | Oshita | |

(Continued)

OTHER PUBLICATIONS

Kurt Lender et al., "Questions from the Compute Express Link Exploring Coherent Memory and Innovative Cases Webinar", Apr. 13, 2020, CXL Consortium, pp. 1-6.
Planet Analog, "The basics of SerDes (serializers/deserializers) for interfacing", Dec. 1, 2020, Planet Analog, as preserved by the internet Archive, pp. 1-9.
Farjadrad et al., "A Bunch of Wires (BoW) Interface for Inter-Chiplet Communication", 2019 IEEE Symposium on High-Performance Interconnects (HOTI), pp. 27-30, Oct. 2019.

(Continued)

*Primary Examiner* — Idriss N Alrobaye
*Assistant Examiner* — Henry W Yu
(74) *Attorney, Agent, or Firm* — Lance Kreisman; Peninsula Patent Group

(57) ABSTRACT

Semiconductor devices, packaging architectures and associated methods are disclosed. In one embodiment, a memory chiplet is disclosed. The memory chiplet includes memory control circuitry for controlling at least one memory die of a first memory type. A die-to-die (D2D) interface circuit couples to a host IC chiplet. The D2D interface circuit includes input/output (I/O) circuitry for coupling to multiple signaling lanes for transferring information packets with the host IC chiplet.

24 Claims, 5 Drawing Sheets

(56) References Cited

U.S. PATENT DOCUMENTS

| | | |
|---|---|---|
| 7,535,958 B2 | 5/2009 | Best |
| 7,593,271 B2 | 9/2009 | Ong |
| 7,701,957 B1 | 4/2010 | Bicknell |
| 7,907,469 B2 | 3/2011 | Sohn et al. |
| 7,978,754 B2 | 7/2011 | Yeung |
| 8,004,330 B1 | 8/2011 | Acimovic |
| 8,024,142 B1 | 9/2011 | Gagnon |
| 8,121,541 B2 | 2/2012 | Rofougaran |
| 8,176,238 B2 | 5/2012 | Yu et al. |
| 8,468,381 B2 | 6/2013 | Jones |
| 8,483,579 B2 | 7/2013 | Fukuda |
| 8,546,955 B1 | 10/2013 | Wu |
| 8,704,364 B2 | 4/2014 | Banijamali et al. |
| 8,861,573 B2 | 10/2014 | Chu |
| 8,948,203 B1 | 2/2015 | Nolan |
| 8,982,905 B2 | 3/2015 | Kamble |
| 9,088,334 B2 | 7/2015 | Chakraborty |
| 9,106,229 B1 | 8/2015 | Hutton |
| 9,129,935 B1 | 9/2015 | Chandrasekar |
| 9,294,313 B2 | 3/2016 | Prokop |
| 9,349,707 B1 | 5/2016 | Sun |
| 9,379,878 B1 | 6/2016 | Lugthart |
| 9,432,298 B1 | 8/2016 | Smith |
| 9,558,143 B2 | 1/2017 | Leidel |
| 9,832,006 B1 | 11/2017 | Bandi |
| 9,842,784 B2 | 12/2017 | Nasrullah |
| 9,886,275 B1 | 2/2018 | Carlson |
| 9,934,842 B2 | 4/2018 | Mozak |
| 9,961,812 B2 | 5/2018 | Suorsa |
| 9,977,731 B2 | 5/2018 | Pyeon |
| 10,171,115 B1 | 1/2019 | Shirinfar |
| 10,394,737 B1 | 8/2019 | Ngo |
| 10,402,363 B2 | 9/2019 | Long et al. |
| 10,410,694 B1 | 9/2019 | Arbel |
| 10,439,661 B1 | 10/2019 | Heydari |
| 10,642,767 B1 | 5/2020 | Farjadrad |
| 10,678,738 B2 | 6/2020 | Dai |
| 10,735,176 B1 | 8/2020 | Heydari |
| 10,748,852 B1 | 8/2020 | Sauter |
| 10,803,548 B2 | 10/2020 | Matam et al. |
| 10,804,204 B2 | 10/2020 | Rubin et al. |
| 10,825,496 B2 | 11/2020 | Murphy |
| 10,855,498 B1 | 12/2020 | Farjadrad |
| 10,935,593 B2 | 3/2021 | Goyal |
| 11,088,876 B1 | 8/2021 | Farjadrad |
| 11,100,028 B1* | 8/2021 | Subramaniam ..... G06F 13/4221 |
| 11,164,817 B2 | 11/2021 | Rubin et al. |
| 11,204,863 B2 | 12/2021 | Sheffler |
| 11,581,282 B2 | 2/2023 | Elshirbini |
| 11,669,474 B1* | 6/2023 | Lee ........................... G06F 1/10 |
| | | 710/11 |
| 11,789,649 B2 | 10/2023 | Chatterjee et al. |
| 11,841,815 B1 | 12/2023 | Farjadrad |
| 11,842,986 B1 | 12/2023 | Ramin |
| 11,855,043 B2 | 12/2023 | Farjadrad |
| 11,855,056 B1 | 12/2023 | Rad |
| 11,892,242 B2 | 2/2024 | Mao |
| 11,893,242 B1 | 2/2024 | Farjadrad |
| 11,983,125 B2 | 5/2024 | Soni |
| 12,001,355 B1 | 6/2024 | Dreier |
| 2002/0122479 A1 | 9/2002 | Agazzi |
| 2002/0136315 A1 | 9/2002 | Chan |
| 2004/0088444 A1 | 5/2004 | Baumer |
| 2004/0113239 A1 | 6/2004 | Prokofiev |
| 2004/0130347 A1 | 7/2004 | Moll |
| 2004/0156461 A1 | 8/2004 | Agazzi |
| 2005/0041683 A1 | 2/2005 | Kizer |
| 2005/0134306 A1 | 6/2005 | Stojanovic |
| 2005/0157781 A1 | 7/2005 | Ho |
| 2005/0205983 A1 | 9/2005 | Origasa |
| 2006/0060376 A1 | 3/2006 | Yoon |
| 2006/0103011 A1 | 5/2006 | Andry |
| 2006/0158229 A1 | 7/2006 | Hsu |
| 2006/0181283 A1 | 8/2006 | Wajcer |
| 2006/0188043 A1 | 8/2006 | Zerbe |
| 2006/0250985 A1 | 11/2006 | Baumer |
| 2006/0251194 A1 | 11/2006 | Bublil |
| 2007/0281643 A1 | 12/2007 | Kawai |
| 2008/0063395 A1 | 3/2008 | Royle |
| 2008/0143422 A1 | 6/2008 | Lalithambika |
| 2008/0186987 A1 | 8/2008 | Baumer |
| 2008/0222407 A1 | 9/2008 | Carpenter |
| 2009/0113158 A1 | 4/2009 | Schnell |
| 2009/0154365 A1 | 6/2009 | Diab |
| 2009/0174448 A1 | 7/2009 | Zabinski |
| 2009/0220240 A1 | 9/2009 | Abhari |
| 2009/0225900 A1 | 9/2009 | Yamaguchi |
| 2009/0304054 A1 | 12/2009 | Tonietto |
| 2010/0177841 A1 | 7/2010 | Yoon |
| 2010/0197231 A1 | 8/2010 | Kenington |
| 2010/0294547 A1 | 11/2010 | Hatanaka |
| 2011/0029803 A1 | 2/2011 | Redman-White |
| 2011/0038286 A1 | 2/2011 | Ta |
| 2011/0167297 A1 | 7/2011 | Su |
| 2011/0187430 A1 | 8/2011 | Tang |
| 2011/0204428 A1 | 8/2011 | Erickson |
| 2011/0267073 A1 | 11/2011 | Chengson |
| 2011/0293041 A1 | 12/2011 | Luo |
| 2012/0082194 A1 | 4/2012 | Tam |
| 2012/0182776 A1 | 7/2012 | Best |
| 2012/0192023 A1 | 7/2012 | Lee |
| 2012/0216084 A1 | 8/2012 | Chun |
| 2012/0327818 A1 | 12/2012 | Takatori |
| 2013/0181257 A1* | 7/2013 | Ngai ................... H01L 25/0657 |
| | | 257/209 |
| 2013/0222026 A1 | 8/2013 | Havens |
| 2013/0249290 A1 | 9/2013 | Buonpane |
| 2013/0285584 A1 | 10/2013 | Kim |
| 2014/0016524 A1 | 1/2014 | Choi |
| 2014/0048947 A1 | 2/2014 | Lee |
| 2014/0126613 A1 | 5/2014 | Zhang |
| 2014/0192583 A1 | 7/2014 | Rajan |
| 2014/0269860 A1 | 9/2014 | Brown |
| 2014/0269983 A1 | 9/2014 | Baeckler |
| 2015/0012677 A1 | 1/2015 | Nagarajan |
| 2015/0172040 A1 | 6/2015 | Pelekhaty |
| 2015/0180760 A1 | 6/2015 | Rickard |
| 2015/0206867 A1 | 7/2015 | Lim |
| 2015/0271074 A1 | 9/2015 | Hirth |
| 2015/0326348 A1 | 11/2015 | Shen |
| 2015/0358005 A1 | 12/2015 | Chen |
| 2016/0056125 A1 | 2/2016 | Pan |
| 2016/0071818 A1 | 3/2016 | Wang |
| 2016/0111406 A1 | 4/2016 | Mak |
| 2016/0217872 A1 | 7/2016 | Hossain |
| 2016/0294585 A1 | 10/2016 | Rahman |
| 2017/0317859 A1 | 11/2017 | Hormati |
| 2017/0331651 A1 | 11/2017 | Suzuki |
| 2018/0010329 A1 | 1/2018 | Golding, Jr. |
| 2018/0082981 A1 | 3/2018 | Gowda |
| 2018/0137005 A1 | 5/2018 | Wu |
| 2018/0175001 A1 | 6/2018 | Pyo |
| 2018/0190635 A1 | 7/2018 | Choi |
| 2018/0210830 A1 | 7/2018 | Malladi et al. |
| 2018/0315735 A1 | 11/2018 | Delacruz |
| 2019/0044764 A1 | 2/2019 | Hollis |
| 2019/0058457 A1 | 2/2019 | Ran |
| 2019/0108111 A1 | 4/2019 | Levin |
| 2019/0198489 A1 | 6/2019 | Kim |
| 2019/0319626 A1 | 10/2019 | Dabral |
| 2020/0051961 A1 | 2/2020 | Rickard |
| 2020/0105718 A1 | 4/2020 | Collins et al. |
| 2020/0257619 A1 | 8/2020 | Sheffler |
| 2020/0373286 A1 | 11/2020 | Dennis |
| 2021/0056058 A1 | 2/2021 | Lee |
| 2021/0082875 A1 | 3/2021 | Nelson |
| 2021/0117102 A1 | 4/2021 | Grenier |
| 2021/0181974 A1 | 6/2021 | Ghosh |
| 2021/0183842 A1 | 6/2021 | Fay |
| 2021/0193567 A1 | 6/2021 | Cheah et al. |
| 2021/0225827 A1 | 7/2021 | Lanka |
| 2021/0258078 A1 | 8/2021 | Meade |
| 2021/0311900 A1 | 10/2021 | Malladi |
| 2021/0365203 A1 | 11/2021 | O |

(56) References Cited

U.S. PATENT DOCUMENTS

| | | | |
|---|---|---|---|
| 2022/0051989 A1 | 2/2022 | Agarwal | |
| 2022/0121381 A1* | 4/2022 | Brewer | G06F 3/0644 |
| 2022/0159860 A1 | 5/2022 | Winzer | |
| 2022/0179792 A1* | 6/2022 | Banerjee | G06F 12/0835 |
| 2022/0222198 A1 | 7/2022 | Lanka | |
| 2022/0223522 A1 | 7/2022 | Scearce | |
| 2022/0237138 A1 | 7/2022 | Lanka | |
| 2022/0254390 A1* | 8/2022 | Gans | H03K 19/20 |
| 2022/0327276 A1* | 10/2022 | Seshan | G06F 13/382 |
| 2022/0334995 A1 | 10/2022 | Das Sharma | |
| 2022/0342840 A1* | 10/2022 | Das Sharma | G06F 13/4295 |
| 2023/0022507 A1* | 1/2023 | Philippe | H01L 25/0652 |
| 2023/0039033 A1 | 2/2023 | Zarkovsky | |
| 2023/0068802 A1 | 3/2023 | Wang | |
| 2023/0090061 A1 | 3/2023 | Zarkovsky | |
| 2023/0181599 A1 | 5/2023 | Erickson | |
| 2023/0359579 A1* | 11/2023 | Madhira | G06F 1/14 |
| 2024/0028206 A1* | 1/2024 | Baronne | G06F 3/0664 |
| 2024/0273041 A1 | 8/2024 | Lee | |

OTHER PUBLICATIONS

Universal Chiplet Interconnect Express (UCle) Specification Rev. 1.0, Feb. 24, 2022.

Block Memory Generator v8.2 LogiCORE IP Product Guide Vivado Design Suite; Xilinx; Apr. 1, 2015.

"Hot Chips 2017: Intel Deep Dives Into EMIB", TomsHardware. com; Aug. 25, 2017.

"Using Chiplet Encapsulation Technology to Achieve Processing-In-Memory Functions"; Micromachines 2022, 13, 1790; https://www.mdpi.com/journal/micromachines; Tian et al.

"Multiport memory for high-speed interprocessor communication in MultiCom;" Scientia Iranica, vol. 8, No. 4, pp. 322-331; Sharif University of Technology, Oct. 2001; Asgari et al.

Universal Chiplet Interconnect Express (UCle) Specification, Revision 1.1, Version 1.0, Jul. 10, 2023.

Hybrid Memory Cube Specification 2.1, Hybrid Memory Cube Consortium, HMC-30G-VSR Phy, 2014.

"Using Dual Port Memory as Interconnect", EE Times, Apr. 26, 2005, Daniel Barry.

Quartus II Handbook Version 9.0 vol. 4: SOPC Builder; "System Interconnect Fabric for Memory-Mapped Interfaces"; Mar. 2009.

* cited by examiner

UNIVERSAL MEMORY INTERFACE UTILIZING DIE-TO-DIE (D2D) INTERFACES BETWEEN CHIPLETS

CROSS-REFERENCE TO RELATED APPLICATIONS

This application is a Non-Provisional that claims priority to U.S. Provisional Application No. 63/543,517, filed Oct. 11, 2023, entitled UNIVERSAL MEMORY INTERFACE (UMI) WITH HALF-DUPLEX BIDIRECTIONAL D2D & C2C PHY'S FOR PACKET-BASED MEMORY TRAFFIC TRANSFER, which is incorporated herein by reference in its entirety.

TECHNICAL FIELD

The disclosure herein relates to semiconductor devices, packaging and associated methods.

BACKGROUND

As integrated circuit (IC) chips such as system on chips (SoCs) become larger, the yields realized in manufacturing the chips become smaller. Decreasing yields for larger chips increases overall costs for chip sellers. To address the yield problem, chiplet architectures have been proposed that favor a modular approach to SoCs. The solution employs smaller sub-processing chips, each containing a well-defined subset of functionality. Chiplets thus allow for dividing a complex design, such as a high-end processor or networking chip, into several small die instead of one large monolithic die.

When accessing memory, traditional chiplet architectures often employ relatively large and complex die-to-die (D2D) interfaces for transferring data between the chiplet and a specific memory type. While beneficial in certain circumstances, many conventional D2D interfaces are typically designed to support a variety of applications. Using generic interfaces specifically for memory applications in a chiplet context is often non-optimal, with sacrifices in area, latency and power efficiency often made in the interests of wider interface applicability.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Semiconductor devices, packaging architectures and associated methods are disclosed. In one embodiment, a memory chiplet is disclosed. The memory chiplet includes memory control circuitry for controlling at least one memory die of a first memory type. A die-to-die (D2D) interface circuit couples to a host IC chiplet. The D2D interface circuit includes input/output (I/O) circuitry for coupling to multiple signaling lanes for transferring information packets with the host IC chiplet. For some embodiments, the D2D interface circuit includes data I/O circuitry and control I/O circuitry for coupling to multiple data lanes and at least one control lane for transferring data and control data packets with the host IC chiplet. By employing a packet-based D2D interface in a chiplet environment for memory applications, bandwidth, power and area efficiencies may be realized while reducing overall costs.

Throughout the disclosure provided herein, the term multi-chip module (MCM) is used to represent a semiconductor device that incorporates multiple semiconductor die or sub-packages in a single unitary package. An MCM may also be referred to as a system in a package (SiP). The die or sub-packages are referred to herein as chiplets. The die or sub-packages that are interconnected in an MCM or SiP are referred to herein as chiplets. Packaged die that are disposed external to an MCM or SiP, such as being mounted on a printed circuit board (PCB), are referred to herein as chips.

Figure 1:
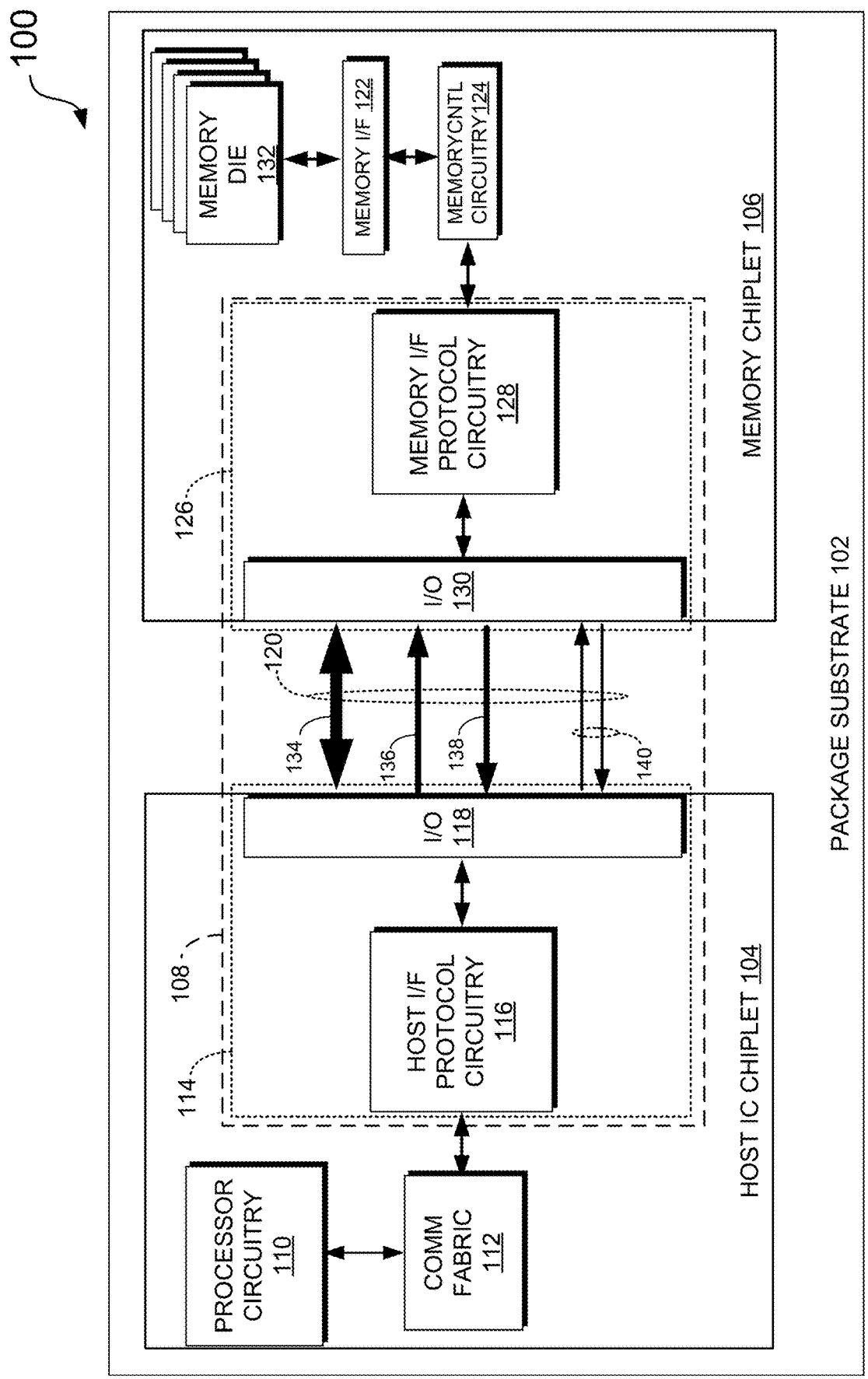
FIG. 1 illustrates a high-level top plan view of a multi-chip module (MCM), including a first integrated circuit (IC) chiplet that is coupled to a memory chiplet via a universal memory interface (UMI).

FIG. 1 illustrates one embodiment of an MCM, generally designated 100, that employs a package substrate 102 for mounting a host integrated circuit (IC) chiplet 104 and a memory chiplet 106. A die-to-die (D2D) interface circuit 108 provides a memory-optimized communications interface that runs a unique packet-based protocol for memory transactions between the host IC chiplet 104 and the memory chiplet 106. The D2D interface circuit 108 described herein may be employed to support memory operations involving a wide variety of memory types in a universal manner. Employing a packet-based and memory-optimized D2D interface that may be universally employed for different memory types enhances pin bandwidth efficiency, reduces power consumption, and lowers latency for memory-related transactions.

Further referring to FIG. 1, the package substrate 102 may take a variety of forms, depending on the application. For some embodiments, the package substrate 102 may be realized as a "standard" package substrate, formed with an organic non-silicon material and incorporating a relatively sparse trace density appropriate for standard ball grid array (BGA) contact arrays (such as on the order of approximately one hundred to one hundred fifty microns). In other embodiments, the package substrate 102 may take the form of an "advanced" package substrate.

With continued reference to FIG. 1, the host IC chiplet 104 generally includes processor circuitry 110 or other logic that performs operations on data, with the need to periodically carry out read and write data transfers with the memory chiplet 106. The processor circuitry 110 may take the form of one or more processors such as a computer processing unit (CPU), graphics processing unit (GPU), tensor processing unit (TPU), artificial intelligence (AI) processing circuitry, field-programmable gate array (FPGA) circuitry or other form of host chiplet with a need to access memory.

Further referring to FIG. 1, the host IC chiplet 104 may include a communications fabric 112 for controlling communications on-chip, and for also controlling how the host IC chiplet 104 communicates off-chip with other chiplets, such as the memory chiplet 106. For one embodiment, the communications fabric 112 includes network-on-chip (NoC) circuitry, such as that disclosed in U.S. patent Ser. No. 18/528,702, filed Dec. 4, 2023, titled: "UNIVERSAL NET- WORK-ATTACHED MEMORY ARCHITECTURE", owned by the assignee of the instant application and expressly incorporated herein by reference.

With continued reference to FIG. 1, the host IC chiplet 104 includes a host interface sub-circuit 114 of the overall D2D interface circuit 108. For one embodiment, the host interface sub-circuit 114 includes host interface protocol circuitry 116 and host input/output (I/O) circuitry 118. The host interface protocol circuitry 116 generally cooperates with the communications fabric 112 to provide packet formatting, packet unformatting, and lane selection control functionality, among other things, that are disclosed in copending U.S. patent application Ser. No. 18/652,707, filed May 1, 2024, titled "UNIVERSAL MEMORY INTERFACE WITH DYNAMIC BIDIRECTIONAL DATA TRANSFERS", and U.S. patent application Ser. No. 18/652,751, filed May 1, 2024, titled "UNIVERSAL MEMORY INTERFACE WITH MULTI-FORMAT PACKET PROTOCOL", both of which are assigned to the assignee of the instant application, and both being expressly incorporated by reference. The host I/O circuitry 118 includes host-side transmit and receive circuitry to support transmission and/or receipt of information between the host IC chiplet 104 and the memory chiplet 106 via multiple signaling links 120, which are organized in a manner more fully described below.

Further referring to FIG. 1, for one embodiment, the memory IC chiplet 106 includes a memory-centric interface 122 for accessing memory of a specific standard or type, such as high-bandwidth memory (HBM), double-data rate (DDR) memory, low-power double data rate (LPDDR), graphics double data rate (GDDR), to name but a few. Memory control circuitry 124 is positioned on the memory chiplet 106 rather than the host IC chiplet 104. Positioning the memory control circuitry 124 on the memory chiplet 106 removes the need for the host IC chiplet 104 (often a costly application-specific integrated circuit) to know the type of memory being accessed, thereby allowing the host IC chiplet 104 the freedom to interact with a variety of memory types, and not constrained to one type of memory type associated with a specific on-chip memory controller.

For one embodiment, the memory chiplet 106 includes a second portion of the overall D2D interface 108, referred to herein as a memory interface sub-circuit 126. For one embodiment, the memory interface subcircuit 126 includes memory interface protocol circuitry 128 similar to the host interface protocol circuitry 116, and memory input/output (I/O) circuitry 130 that includes transmit and receive circuitry for supporting the multiple signaling links 120, and that generally corresponds to the host D2D I/O circuitry 118.

For some embodiments, the memory chiplet 106 may take the form of a single-die chiplet that includes the memory control circuitry 124, the memory-centric interface 122, and the features of the memory interface sub-circuit 126. The single-die chiplet may then be employed as a base die upon which are stacked memory die 132 for a stacked memory implementation, such as for HBM. Other embodiments may employ the single die chiplet as a buffer or intermediary between the IC chiplet 104 and memory die 132, with the memory die 132 disposed proximate the single die chiplet on the package substrate 102 or off-MCM (not shown).

For one embodiment, and with continuing reference to FIG. 1, the multiple signaling links 120 are generally organized to optimize memory traffic bandwidth, while reducing power, latency and pin area. At a high level, the multiple signaling links 120 generally include a data link 134 to transfer data between the chiplets 104 and 106, an "egress" link 136 (from the point of view of the host IC chiplet 104) to dispatch request information from the host IC chiplet 104 to the memory IC chiplet 106, and an "ingress" link 138 to transfer response information in an opposite direction to that of the request information. For some embodiments, a sideband link 140 may be employed to assist in low-speed initialization operations, and to perform other out-of-band operations.

Depending on the application, where, for example, a given memory type may include many channels (such as high-bandwidth memory HBM), or only one or two channels (such as dynamic data rate DDR memory), the overall number of multiple signaling links 120 may vary. To appropriately scale to different channel and bandwidth requirements of a wide variety of memory types, one embodiment of the interface circuitry 108 employs a modular unit interface architecture of a minimum granularity to support the data, control, and addressing requirements for a single independent memory transaction.

Figure 2:
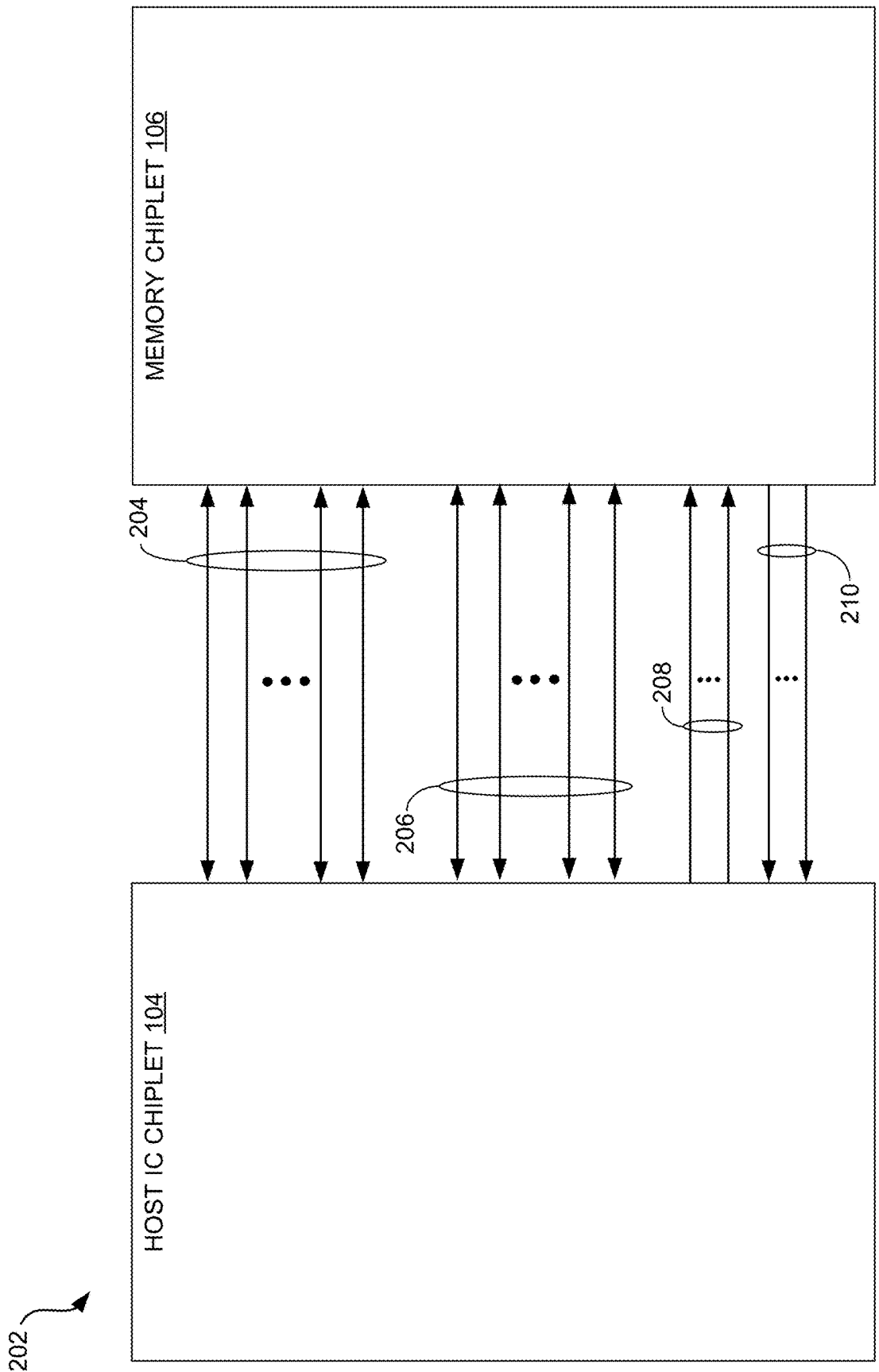
FIG. 2 illustrates one specific embodiment of a unit interface architecture for the universal memory interface of FIG. 1.

Referring now to FIG. 2, one specific embodiment of a unit interface architecture 202 for the multiple signaling links 120 includes bidirectional data lanes 204 and 206. For one specific embodiment, data lane 204 includes a first sub-set of half-duplex bidirectional data lanes while data lane 206 includes a second sub-set of half-duplex bidirectional data lanes. For one specific embodiment suitable for both standard packaging and advanced packaging applications, each of the first and second subsets of data lanes 204 and 206 include thirty-seven data lanes that may be dynamically switched to transfer data in a given direction for the same or different signaling intervals. Additionally, each of the first and second subsets of data lanes 204 and 206 is configured to transfer data for operations that are independent from one another, such as to different channels or banks. This configuration provides full sixty-four byte cacheline data transfers over a lane width that is significantly narrower than proposed ×64 widths, which results in an approximate doubling of per-pin bandwidth efficiency with reduced power consumption.

For one embodiment, the number of data lanes for each subset of data lanes 204 and 206 is optimized to correspond to packet sizes and formats that are optimized for memory traffic to reduce latency, minimize silicon area and lower latency. For example, for a high-bandwidth memory (HBM) context, where an HBM interface may employ a 16:1 serialization, utilizing a data packet granularity that allows for transfer of cacheline blocks (such as sixty-four bytes) of data over a sixteen cycle clock generally allows for aligning data packets to the transmission media, providing significant latency benefits.

Further referring to FIG. 2, the unit interface architecture 202 for one embodiment includes a set of unidirectional request lanes that collectively form the "egress" link 208 (corresponding to the egress link 136 of FIG. 1) for one-way communication from the host IC chiplet 104 to the memory chiplet 106. The egress link 208 generally includes a sufficient number of request lanes to optimize packet sizes with the number of active lanes to reduce latency while minimizing power. Information packets issued along the egress link generally include requests that specify a variety of information fields, including operation type (read or write), destination address, and so forth. For one specific embodiment, the egress link employs 10 lanes.

With continued reference to FIG. 2, similar to the egress link 208, the ingress link 210 (corresponding to the ingress link 138 of FIG. 1) also takes the form of a unidirectional set of lanes for one-way transfer from the memory chiplet 106 to the host IC chiplet 104. Packets transferred along the ingress link generally provide response information that may include acknowledgement information, failure notification information, data bus direction information, and/or other information indicating the results of requests sent by the host IC chiplet 104. Since the response information typically involves a reduced set of bits, the number of ingress lanes may be fewer than the egress lanes. For one specific embodiment, the ingress link employs 2 lanes.

Figure 3A:
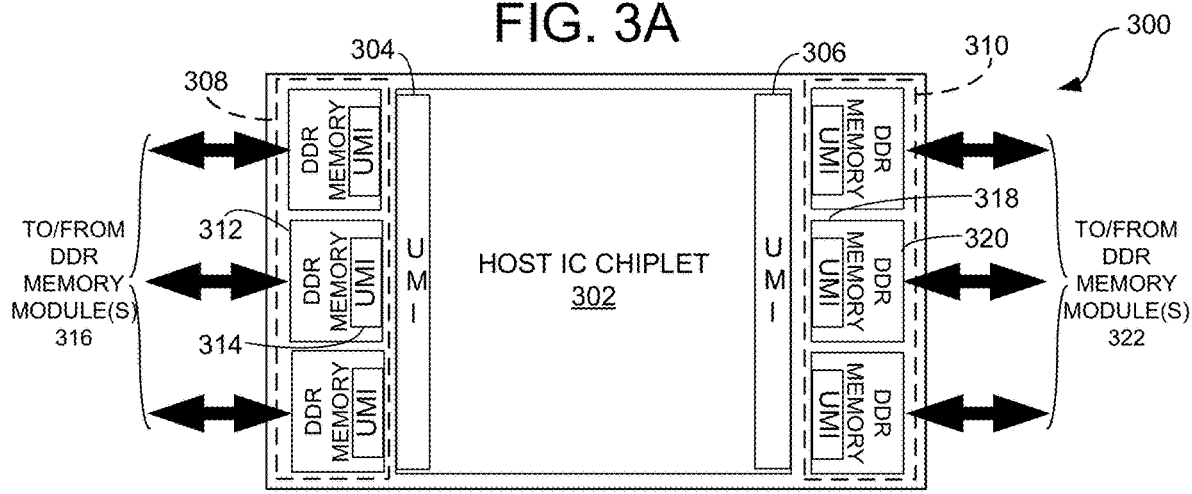
FIGS. 3A-3C illustrate various embodiments of the UMI of FIG. 1 connecting an application-specific integrated circuit (ASIC) to memory chiplets of different memory types.

FIG. 3A illustrates one embodiment of an MCM 300, similar to that of FIG. 1, with a host chiplet 302 employing multiple interface beachfronts 304 and 306 formed with respective UMI host interface sub-circuits to connect with respective groups of memory chiplets 308 and 310 consistent with the UMI D2D interface architecture described above. For one embodiment, each memory chiplet of the first group of memory chiplets 308 includes a UMI memory chiplet sub-interface 314 for communicating with the UMI host IC chiplet interface subcircuit 304, and a double data rate dynamic random access memory (DDR DRAM) memory controller 312 to access any form of off-MCM memory such as one or more DDR DRAM memory modules 316, or low-power double data rate (LPDDR), or graphics double data rate (GDDR), or high-bandwidth memory (HBM) as examples. The memory chiplets of the second group of memory chiplets 310 are configured similarly to the first group of memory chiplets 308, with a UMI interface sub-circuit 318 and a DDR memory controller 320 for interfacing with one or more DRAM memory modules 322. By employing the bandwidth-efficient UMI unit interface architecture described above, the limited-area interface beachfronts 304 and 306 of the host chiplet 302 are able to employ more bandwidth-efficient I/O resources that allow significant scaling of overall memory bandwidth associated with the ability to access additional memory chiplets. This also translates into being able to bring more bandwidth to the beachfront edge. In a similar manner, using the bandwidth-efficient UMI D2D interfaces in the memory chiplets 308 allows for connecting more memory-specific physical interfaces that wouldn't otherwise be able to fit on the beachfront edges.

Figure 3B:
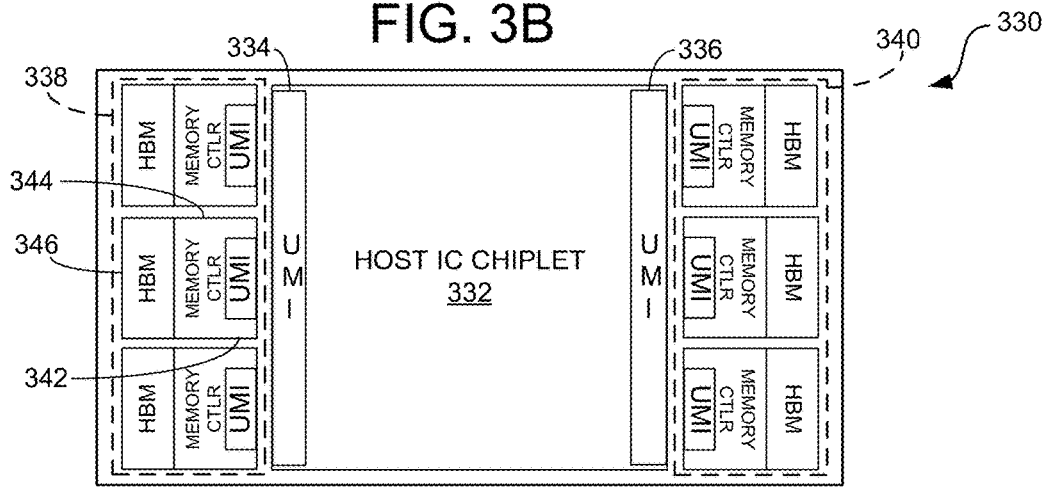

FIG. 3B illustrates a further embodiment of an MCM 330, similar to the MCM 100 of FIG. 1, with a host chiplet 332 employing multiple interface beachfronts 334 and 336 formed with respective UMI host interface sub-circuits to connect with respective first and second groups of HBM memory chiplets 338 and 340 consistent with the UMI D2D interface architecture described above. For the embodiment of FIG. 3B, each HBM memory chiplet of the first group of memory chiplets 338 includes a UMI memory chiplet sub-interface 342 for communicating with the UMI host IC chiplet interface subcircuit 334, an HBM memory controller 344 to access on-chiplet memory in the form of a stack of HBM memory die 346. Each HBM memory chiplet of the second group of memory chiplets 340 is configured similar to those of the first group of memory chiplets 338.

Figure 3C:
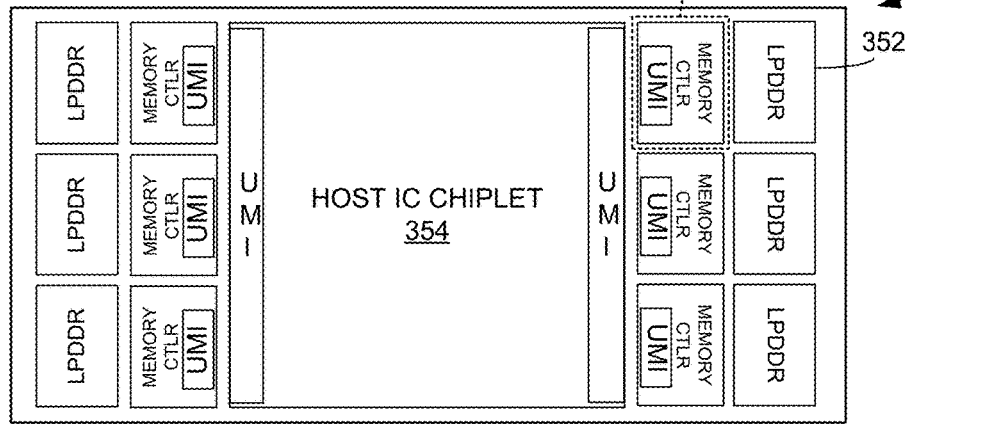

FIG. 3C illustrates an additional embodiment of an MCM 350, similar to the MCM 100 of FIG. 3A, but configured to include on-MCM low-power (LP) DDR DRAM chiplets 352 that are disposed on the MCM 350 and accessible as near-memory to a host chiplet 354 via an intermediate memory chiplet 356.

The D2D interface described above, while optimized for use in a variety of memory applications between chiplets, may also be utilized in many situations to provide bandwidth, latency and area advantages in a chip-to-chip (C2C) copper interface context. A C2C interface often employs longer-reach copper links than a D2D interface to interconnect separate fully-packaged semiconductor modules, such as multiple MCMs or SiPs. In a memory context, a given MCM or SiP, such as that described above, may use the packetized UMI D2D interface described above to interconnect chiplets, and utilize a similarly packetized UMI C2C interface to connect the MCM to one or more off-chip memory modules or other form of semiconductor module.

Figure 4:
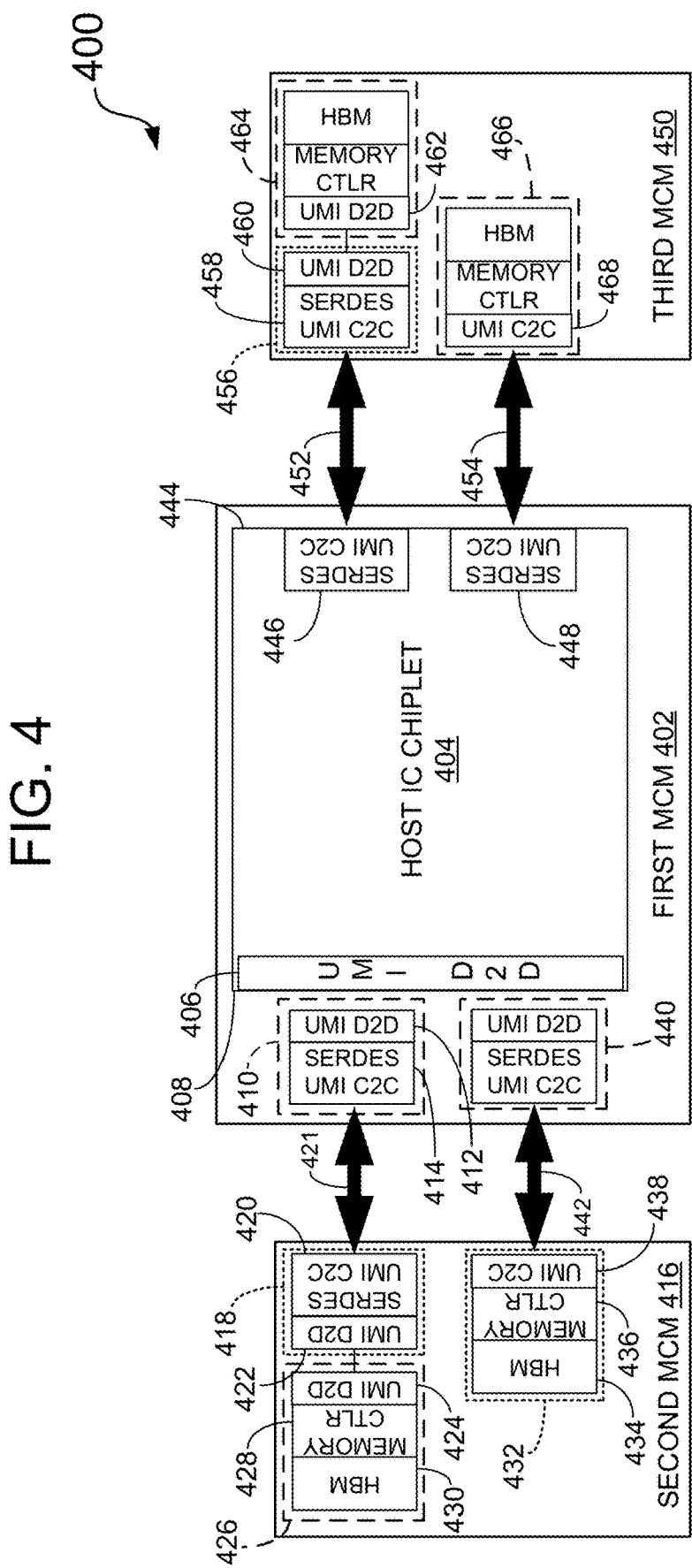
FIG. 4 illustrates a top plan view of multiple semiconductor packaged devices that are interconnected by an embodiment of the UMI of FIG. 1.

FIG. 4 illustrates one embodiment of a system of multi-chip modules, generally designated 400, that are interconnected by long-reach copper links. The system 400 includes a first MCM 402 where a host IC chiplet 404 employs a UMI D2D interface 406 on a first beachfront edge 408 of the host IC chiplet 404 to access multiple UMI serializer/deserializer (SerDes) chiplets 410 that are disposed on the first MCM 402. The SerDes chiplets 410 each include a UMI D2D interface 412 to communicate with the host IC chiplet 404, and also a SerDes-based UMI C2C interface 414 to communicate with a second MCM 416.

Further referring to FIG. 4, a SerDes chiplet 418 on the second MCM 416 includes a SerDes-based UMI C2C interface 420 for coupling to the corresponding SerDes-based UMI C2C interface 414 of the first MCM 402 via a first long-reach link 421. For one embodiment, the SerDes-based UMI C2C interface is a narrowed serialized form of the UMI D2D interface described above, with fewer lanes based on the serialization ratio that is employed. The SerDes chiplet 418 also includes a UMI D2D interface 422 to communicate with a corresponding UMI D2D interface 424 that is included in an HBM memory chiplet 426 that is also disposed on the second MCM 416. The HBM memory chiplet 426 includes an HBM memory controller 428 and a stack of HBM memory die 430. A second HBM memory chiplet 432 is also disposed on the second MCM 416 and includes HBM memory die 434, and an HBM memory controller 436. The second HBM memory chiplet 432 incorporates the functionality of a UMI C2C interface, at 438, and couples to another one of the SerDes chiplets 440 of the first MCM 402 via a second long reach link 442.

Further referring to FIG. 4, on a second beachfront edge 444, the host IC chiplet 402 employs multiple SerDes-based UMI C2C interfaces 446 and 448 that are embedded in the host IC chiplet and interconnect to a third MCM 450 via corresponding long-reach links 452 and 454. A UMI SerDes chiplet 456 on the third MCM 450 includes a UMI SerDes C2C interface 458 that communicates with the SerDes chiplet 446 on the first MCM 402. A UMI D2D interface 460 communicates with a corresponding UMI D2D interface 462 that is included in a third HBM memory chiplet 464 that is also disposed on the third MCM 450. A fourth HBM memory chiplet 466 incorporates the functionality of a UMI C2C interface, at 468, and couples to another one of the SerDes-based UMI C2C interfaces 448 of the first MCM 402 via the fourth long reach link 454.

In addition to the D2D and C2C embodiments described above, the UMI interface described above lends itself well to applications involving optical links and copackaged optical chiplet environments. FIG. 4 illustrates one embodiment of a system of multi-chip modules, generally designated 400, that are interconnected by long-reach optical links. The system 500 includes a first MCM 502 where a host IC chiplet 504 employs a UMI D2D interface 506 on a first beachfront edge 508 of the host IC chiplet 504 to access multiple photonic IC (PIC) chiplets 510 and 540 that are disposed on the first MCM 502. The PIC chiplet 510 includes a UMI D2D interface 512 to communicate with the host IC chiplet 504, and also a copackaged optics (CPO) interface 514 to communicate with a second MCM 516.

Figure 5:
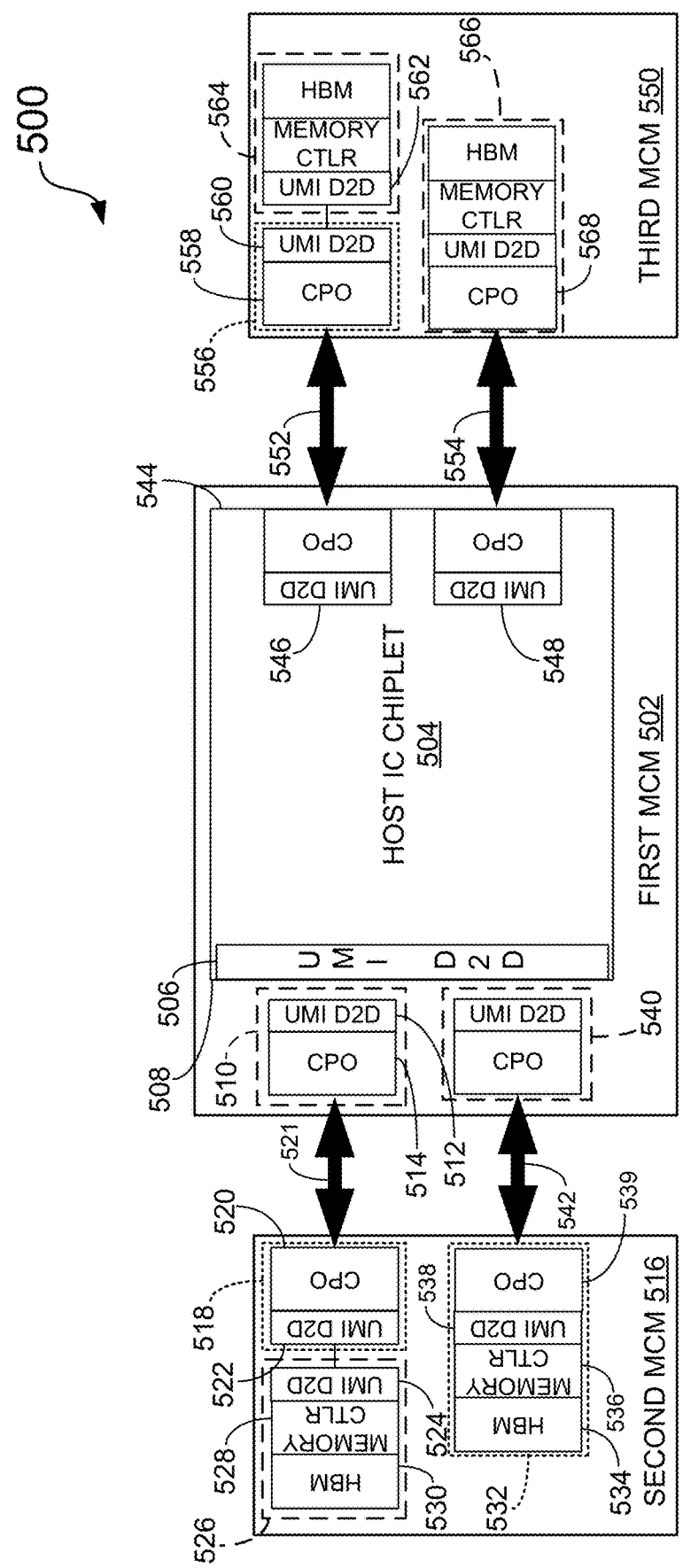
FIG. 5 illustrates a top plan view that is similar to FIG. 3, with multiple optical packaged devices interconnected by an embodiment of the UMI of FIG. 1.

Further referring to FIG. 5, a PIC chiplet 518 on the second MCM 516 includes a CPO interface 520 for coupling to the corresponding CPO interface 514 of the first MCM 502 via a first long-reach link 521. For one embodiment, the CPO interface is an optical fiber-based form of the UMI D2D interface described above. The PIC chiplet 518 also includes a UMI D2D interface 522 to communicate with a corresponding UMI D2D interface 524 that is included in an HBM memory chiplet 526 that is also disposed on the second MCM 516. The HBM memory chiplet 426 includes an HBM memory controller 528 and a stack of HBM memory die 530. A second HBM memory chiplet 532 is also disposed on the second MCM 516 and includes HBM memory die 534, an HBM memory controller 536, and a UMI D2D interface 538. The second HBM memory chiplet 532 incorporates the functionality of a CPO interface, at 539, and couples to the host PIC chiplet 540 of the first MCM 502 via a second long reach link 542.

Further referring to FIG. 5, a second beachfront edge 544 of the host IC chiplet 504 includes multiple CPO interfaces 546 and 548 that are embedded in the host IC chiplet 502 and which interconnect to a third MCM 550 via corresponding long-reach optical links 552 and 554. A PIC chiplet 556 on the third MCM 550 includes a CPO interface 558 that communicates with the PIC chiplet 546 on the first MCM 502 via the first optical link 552. A UMI D2D interface 560 communicates with a corresponding UMI D2D interface 562 that is included in a third HBM memory chiplet 564 that is also disposed on the third MCM 550. A fourth HBM memory chiplet 566 embeds the functionality of a CPO interface, at 568, and couples to another one of the CPO interfaces 548 of the first MCM 502 via the fourth long reach optical link 554.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present disclosure. In some instances, the terminology and symbols may imply specific details that are not required to practice aspects of the disclosure. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low level for active-low signals or high logic level for active-hich signals (or discharged to low logic state or charged to a high logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While aspects of the disclosure been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A chiplet-based multi-chip module (MCM), comprising:
 a package substrate;
 a host integrated circuit (IC) chiplet coupled to the package substrate and comprising:
  at least one processing element;
  a communications fabric switchably coupled to the at least one processing element; and
  a primary die-to-die (D2D) interface to transfer memory information via a packet protocol from the at least one processing element via the communications fabric;
 at least one memory chiplet comprising:
  a secondary D2D interface coupled to the primary D2D interface via multiple signaling lanes;

a memory port comprising a memory physical interface of at least one first memory type for accessing memory storage of the at least one first memory type; and wherein the multiple signaling lanes are configured to route information packets controlled by the communications fabric between the host IC chiplet and the at least one memory chiplet.

2. The chiplet-based MCM of claim 1, wherein:
the communications fabric comprises a network-on-chip (NoC) circuit.

3. The chiplet-based MCM of claim 1, wherein the multiple signaling lanes comprise:
multiple data lanes to route data packets.

4. The chiplet-based MCM of claim 3, wherein the multiple data lanes comprise:
a first subset of data lanes to transfer first data for a first memory transaction during a first timing interval; and
a second subset of data lanes to transfer second data for a second memory transaction during the first timing interval.

5. The chiplet-based MCM of claim 4, wherein during the first timing interval of operation:
the first subset of data lanes transfers write data for the first memory transaction; and
the second subset of data lanes transfers read data for the second memory transaction.

6. The chiplet-based MCM of claim 3, wherein:
the multiple data lanes comprise half-duplex bidirectional data lanes.

7. The chiplet-based MCM of claim 3, further comprising:
at least one control lane to route control packets controlled by the communications fabric between the host IC chiplet and the at least one memory chiplet.

8. The chiplet-based MCM of claim 7, wherein the at least one control lane comprising:
an egress lane to transmit command and control information unidirectionally from the host IC chiplet to the at least one memory chiplet; and
an ingress lane to receive control information unidirectionally from the at least one memory chiplet to the host IC chiplet.

9. The chiplet-based MCM of claim 1, further comprising:
at least one sideband link coupled between the host IC chiplet and the at least one memory chiplet.

10. The chiplet-based MCM of claim 1, wherein:
the at least one memory chiplet further comprises a memory controller disposed between the secondary D2D interface and the memory port.

11. The chiplet-based MCM of claim 10, wherein:
the secondary D2D interface, the memory port, and the memory controller of the at least one memory chiplet are formed in a base die; and
the memory storage comprises at least one memory die of the at least one first memory type stacked on the base die.

12. The chiplet-based MCM of claim 1, wherein:
the memory storage of the at least one first memory type comprises high bandwidth memory (HBM), double-data rate (DDR) memory, low-power double-data rate (LPDDR) memory or graphics double-data rate (GDDR) memory.

13. A memory chiplet, comprising:
memory control circuitry for to control at least one memory die of a first memory type;
a die-to-die (D2D) interface circuit to couple to a host IC chiplet, the D2D interface circuit coupled to the memory control circuitry and comprising
input/output (I/O) circuitry to couple to multiple signaling lanes and to transfer information packets with the host IC chiplet.

14. The memory chiplet of claim 13, further comprising:
a network-on-chip (NoC) circuit.

15. The memory chiplet of claim 13, wherein the I/O circuitry comprises:
data I/O circuitry to couple to multiple data lanes.

16. The memory chiplet of claim 15, wherein the data I/O circuitry comprises:
a first data I/O portion to transfer first data packets for a first memory transaction during a first timing interval; and
a second data I/O portion to transfer second data packets for a second memory transaction during the first timing interval.

17. The memory chiplet of claim 16, wherein during the first timing interval:
the first data I/O portion receives write data for the first memory transaction; and
the second data I/O portion transmits read data for the second memory transaction.

18. The memory chiplet of claim 15, wherein:
the data I/O circuitry comprises bidirectional data I/O circuitry.

19. The memory chiplet of claim 13, wherein the I/O circuitry further comprises:
control I/O circuitry to couple to at least one control lane and to transfer control packets with the host IC chiplet.

20. The memory chiplet of claim 19, wherein the control I/O circuitry comprising:
an egress I/O circuit to receive command and control information unidirectionally from the host IC chiplet to the memory chiplet; and
an ingress I/O circuit to transmit control information unidirectionally from the memory chiplet to the host IC chiplet.

21. The memory chiplet of claim 13, further comprising:
at least one sideband I/O circuit to couple to a sideband link between the host IC chiplet and the memory chiplet.

22. The memory chiplet of claim 13, wherein:
the memory control circuitry and the D2D interface circuit to couple to the host IC chiplet are formed in a base die; and
the at least one memory die of the first memory type is stacked on the base die.

23. The memory chiplet of claim 22, wherein:
the at least one memory die comprises high bandwidth memory (HBM), double-data rate (DDR) memory, low-power double-data rate (LPDDR) memory or graphics double-data rate (GDDR) memory.

24. A host integrated circuit (IC) chiplet, comprising:
at least one processing element;
a communications fabric switchably coupled to the at least one processing element; and
a die-to-die (D2D) interface to transfer memory information from the at least one processing element via the communications fabric, the D2D interface circuit comprising
input/output (I/O) circuitry to couple to multiple signaling lanes and to transfer information packets to a memory chiplet.

\* \* \* \* \*